United States Patent [19]
Mehrbrodt et al.

[11] 4,001,580
[45] Jan. 4, 1977

[54] SCINTILLATION SCANNER
[75] Inventors: Alfonso W. Mehrbrodt; Walter F. Mog, both of Brecksville; Carl J. Brunnett, Willowick, all of Ohio
[73] Assignee: Picker Corporation, Cleveland, Ohio
[22] Filed: June 3, 1971
[21] Appl. No.: 149,744
[52] U.S. Cl. ............................................. 250/363 S
[51] Int. Cl.² ........................................... G01T 1/20
[58] Field of Search .................... 250/71.5 S, 363 S; 346/33 F, 33 ME

[56] References Cited
UNITED STATES PATENTS

| | | | |
|---|---|---|---|
| 3,221,334 | 11/1965 | Jones, Jr. ...................... | 346/33 ME |
| 3,735,132 | 5/1973 | Colombo et al. ............. | 250/71.5 S |
| R26,014 | 5/1966 | Stickney et al. .............. | 250/71.5 S |

*Primary Examiner*—Davis L. Willis
*Attorney, Agent, or Firm*—Watts, Hoffmann, Fisher & Heinke Co.

[57] ABSTRACT

A scintillation scanner having a visual image producing means coupled through a lost motion connection to the boom which supports the scintillation detector. The lost motion connection is adjustable to compensate for such delays as may occur between sensing and recording scintillations.

13 Claims, 5 Drawing Figures

INVENTORS
ALFONSO W. MEHRBRODT
WALTER F. MOG
CARL J. BRUNNETT

Watts, Hoffmann, Fisher & Heinke
ATTORNEYS

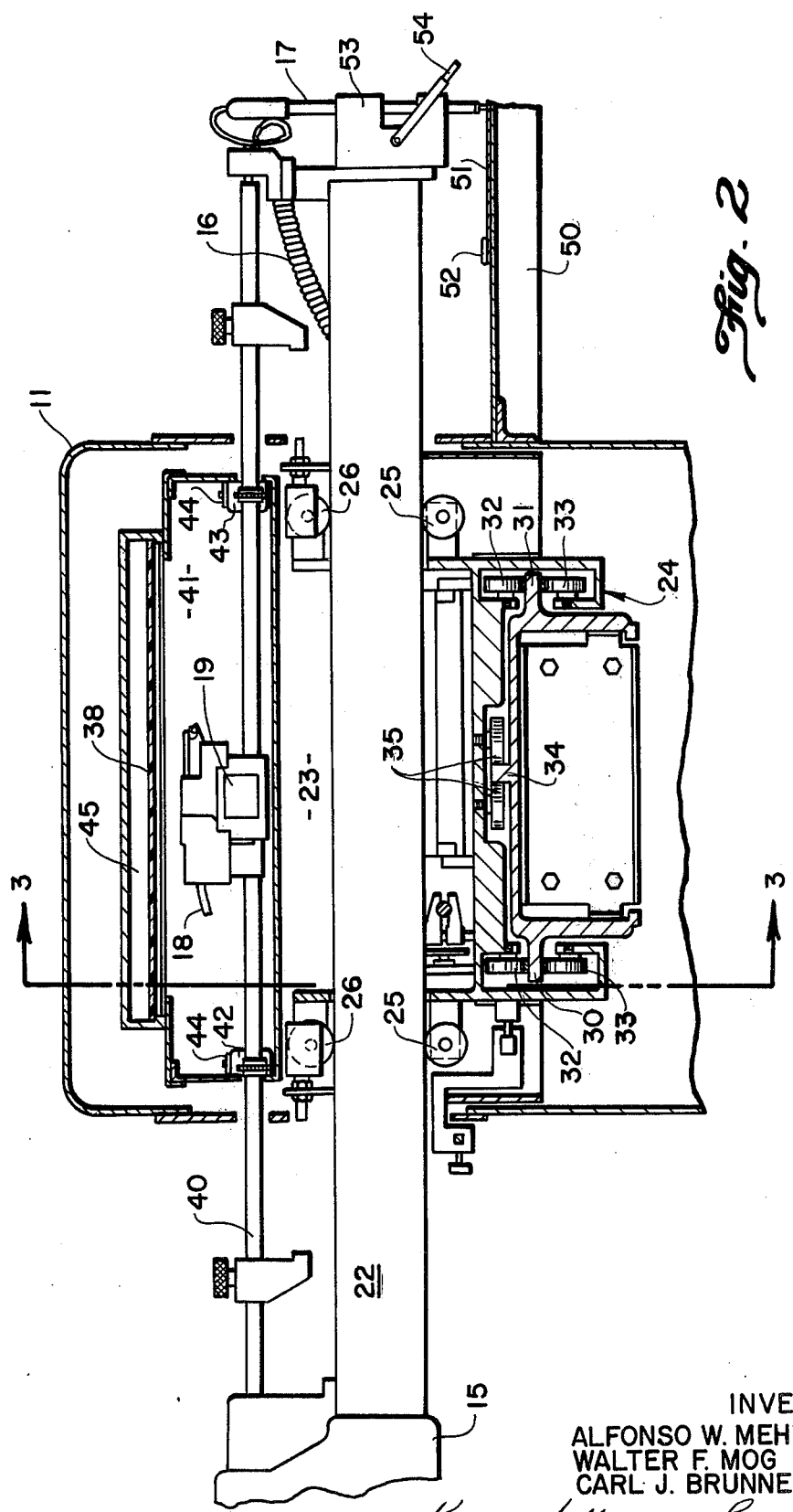

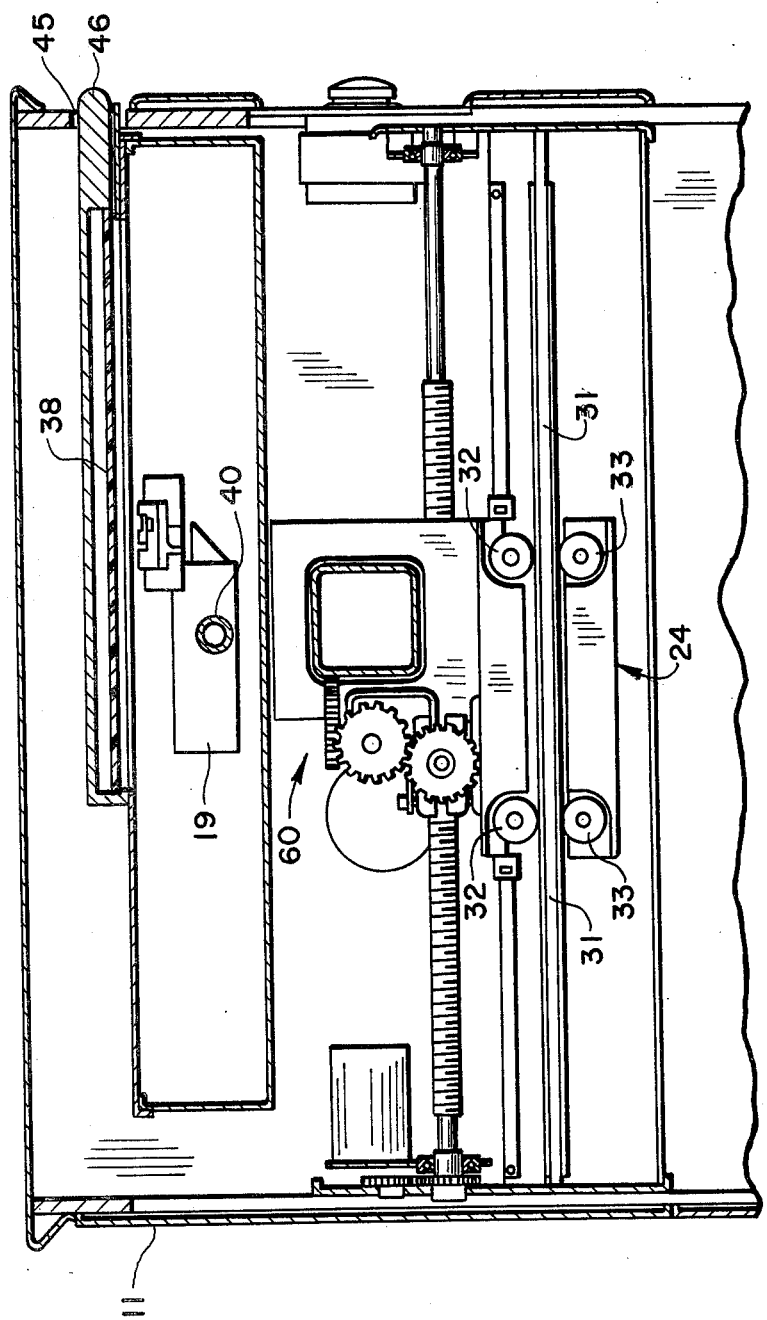

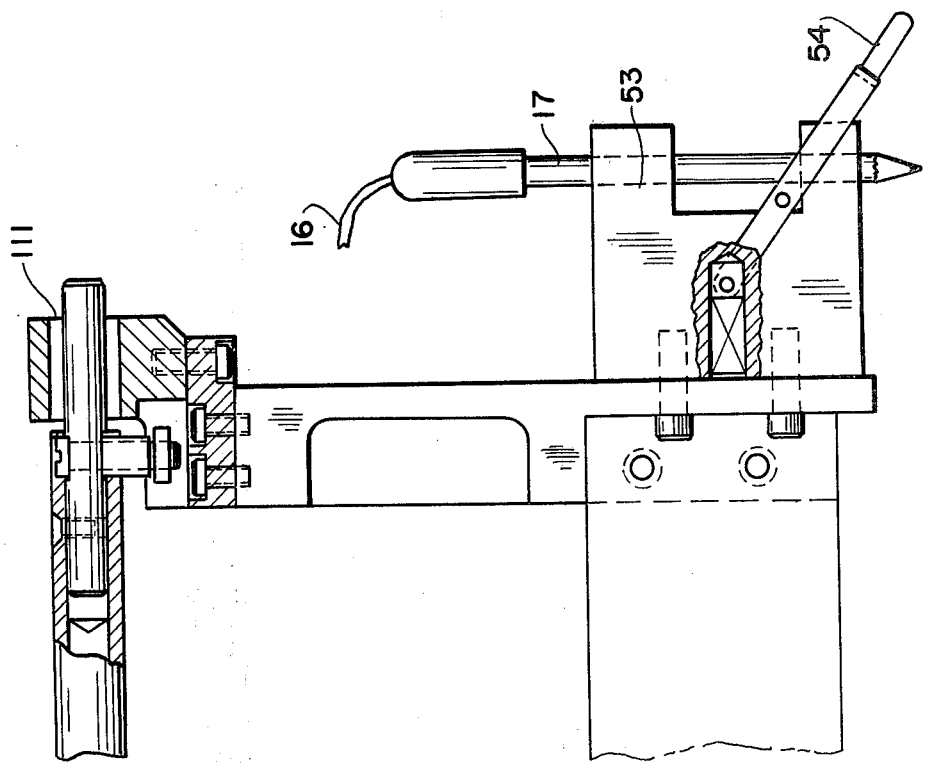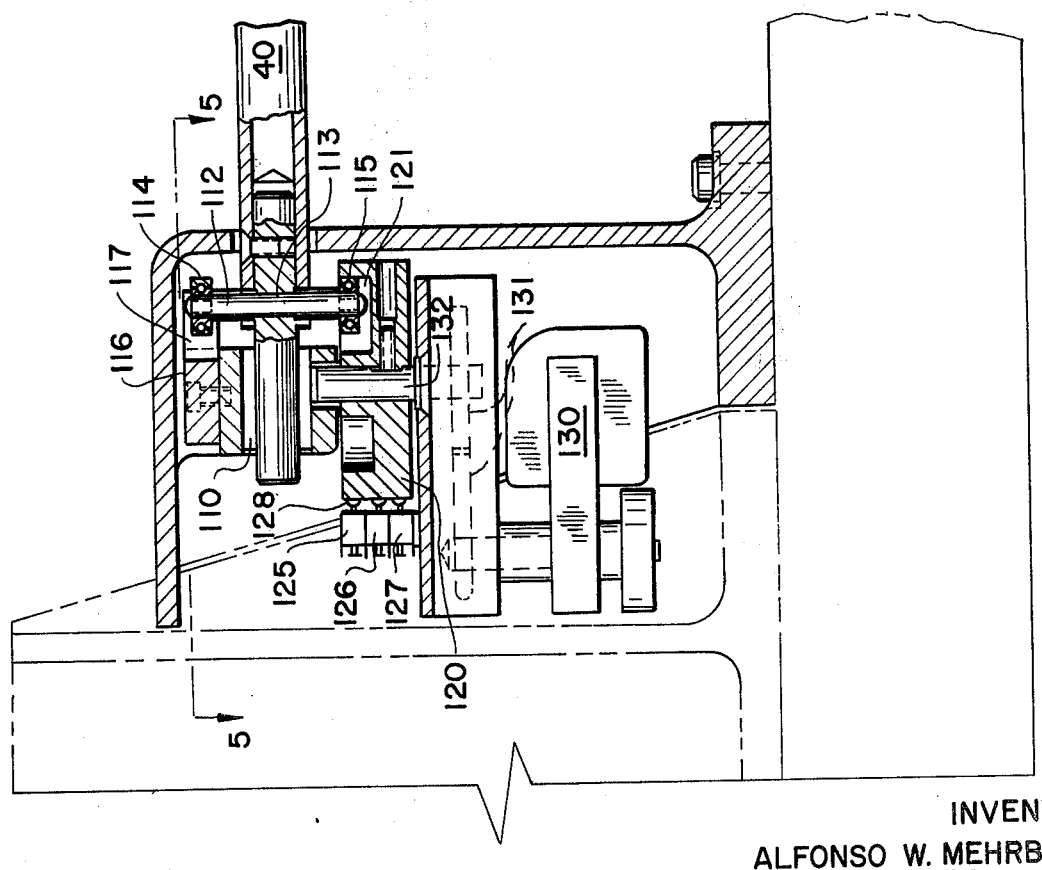
Fig. 4

SCINTILLATION SCANNER

CROSS REFERENCE TO RELATED APPLICATION AND PATENTS

SCINTILLATION SCANNER, U.S. Pat. No. Re. 26,014, reissued May, 3, 1966 to J. B. Stickney et al on original U.S. Pat. No. 3,070,695 issued Dec. 25, 1962. This patent will be referred to as the "Apparatus Patent".

SCINTILLATION SCANNER PHOTO-CIRCUIT, U.S. Pat. No. 3,159,744 issued Dec. 1, 1964 to J. B. Stickney et al. This patent will be referred to as the "Circuit Patent".

SCINTILLATION SCANNER WITH REMOTE CONTROL APERTURE, Ser. No. 149,736 filed concurrently herewith by Albert L. Stoeckel et al.

BACKGROUND OF THE INVENTION

1. Field of the Invention

The present invention relates generally to a scintillation scanner and more particularly to an improved scintillation scanner including an adjustable lost motion connection for coupling the visual image producing means to the detector.

2. Prior Art

In a number of modern medical diagnostic procedures a quantity of radioactive substances is administered to a patient. The distribution of the radioactive substance in the patient's body is then studied. Such studies are useful for many purposes such as locating cancerous tissue and determining the condition of body organs such as the thyroid gland.

Mechanisms known as "scintillation scanners" have commonly been used to conduct such tracer studies. They include a means to move a scintillation probe over an area being studied and a means to provide a graphic reproduction of the activity measured by the probe.

The scintillation scanner of the referenced Apparatus Patent comprises a portable unit which can readily be moved to a patient's bed or other location where a study is to be conducted. The scintillation probe is supported in cantilevered fashion over the patient or other object to be studied. The probe is movable manually to a desired location whereupon its supporting boom is operably connected to an automatic drive to move the probe through a predetermined geographic pattern for a tracer study. The scan is then conducted by moving the probe at a selected speed across a series of parallel paths which are at selected spaced intervals.

A light source and a stylus are carried by the boom and move simultaneously with it. This simultaneous movement permits production of both a dot graphic and a photographic reproduction of the distribution of the isotopes over an area under investigation.

One problem encountered with scintillation scanners relates to the electronic delay in scintillation recording that is encountered with such scanner apparatus. As the scanner passes over an area, receives a scintillation, and converts it into a electric signal, a delay is encountered which results in the scanner having moved to a new position by the time the scintillation is recorded. The length of this delay is dependent on a number of variables but typically is within the range of a few milliseconds to a maximum of a few seconds. Such delay is known as "dead time." When the scanner reaches the end of a scan path it spaces laterally to another scan path and reverses direction. The recording error is then compounded since adjacent scan paths are recorded with the scanner travelling in opposite directions. Hence, scintillations coming from adjacent locations are offset by an amount equal to two times the distance traveled by the scanner boom during the time delay between a scintillation in the probe crystal and a resulting light flash for photo-recording.

As scan speeds have been increased the problem of this offset has become more pronounced. The problem in fact is of sufficient magnitude that it has been given the name "Scalloping."

SUMMARY OF THE INVENTION

The present invention overcomes the foregoing drawbacks of the prior art through the provision of an anti-scalloping adjustable delay error corrections means for assuring side-by-side recording of scintillations from the same region.

A lost-motion connection is provided between the detector and the light source. The lost-motion connection drivingly couples the detector and the light source to delay the reverse reciprocation of the light source relative to the detector upon reversal of the longitudinal reciprocation of the detector, and is adjustable to compensate for such delays as may occur between sensing and recording of scintillations.

A remotely controlled motor is provided for adjusting the lost-motion connection. Limit switches engage the lost-motion mechanism to indicate the settings of this device.

Accordingly, it is the principal object of the present invention to provide a novel and improved scintillation scanner.

Other objects and a fuller understanding of the invention may be had by referring to the following description and claims taken in conjunction with the accompanying drawings.

BRIEF DESCRIPTION OF THE DRAWINGS

FIG. 2 is an enlarged sectional elevational view of a portion of the scanner;

FIG. 3 is a sectional view as seen from the plane indicated by the line 3—3 in FIG. 2;

FIG. 4 is an enlarged sectional view similar to FIG. 2 showing the detector supporting boom in greater detail; and, FIG. 5 is a top sectional view as seen from the plane indicated by the line 5—5 in FIG. 4.

DESCRIPTION OF THE PREFERRED EMBODIMENT

Figure 1:
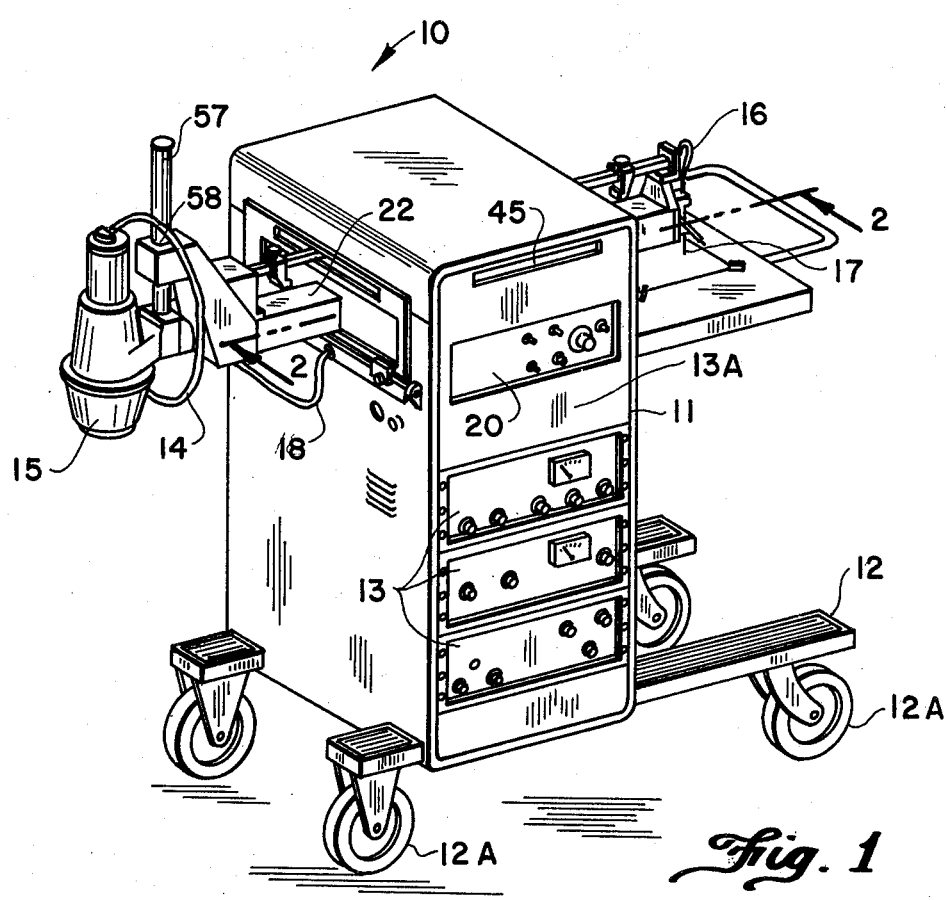
FIG. 1 is a perspective view of the scintillation scanner.

Referring to FIG. 1, a scintillation scanner is shown generally at 10. The scanner 10 includes a housing 11 supported on a base 12. A plurality of wheels 12a support the base for movement of the scanner.

A plurality of control modules 13 are mounted in the housing and have front panels which are essentially aligned with front wall 13a of the housing 11. The control modules 13 include various operator actuated and adjusted circuits of the scintillation scanner. These circuits include a conductor 14 which transmits impulses from a scintillation probe 15. The impulses are transmitted, monitored, and amplified. The impulses are then transmitted through a conductor 16 to a stylus 17, and through a conductor 18 to a light source 19, as shown in FIG. 2.

There are known circuits which are suitable for this purpose, one of which is shown in the referenced Circuit Patent. These circuits do not form a part of the present invention and accordingly are not described in detail here.

A control panel 20 is provided in the upper front wall portion of the housing 11. This control panel 20 includes various operator controlled devices for selectively controlling the movement of the probe 15 during a study. These devices will subsequently be described in greater detail.

Referring to FIG. 2, a boom 22 is supported in a space 23 in the upper portion of the housing 11. The boom 22 supports the scintillation probe 15, the stylus 17, and the light source 19. The boom 22 is supported by a transverse carriage 24. The boom 22 is movable reciprocally along a longitudinal path relative to the carriage 24 and the housing 11. The boom 22 is supported for such reciprocal travel by spaced pairs of rollers 25 which are rotatably supported at the front and rear of the carriage 24. Upper guide rollers 26 are similarly provided at the front and rear of the carriage 24 to coact with the vertical support rollers 25 in vertically positioning the boom 22. Spaced side rollers, not shown, are also similarly mounted on the carriage 24 to transversely position the boom 22 against shifting in a horizontal direction.

The carriage 24, in turn, is supported on front and rear guide tracks 30, 31 for rectilinear travel along a path which is transverse to the path of longitudinal boom travel. Since the boom 22 is carried by the carriage 24, the boom will move transversely with the carriage. The guide tracks 30, 31 form a part of the frame structure of housing 11. A plurality of spaced carriage support rollers 32 and a plurality of coacting carriage positioning rollers 33 support and position the carriage on the guide tracks 30, 31. A central horizontal positioning track 34 also forms a part of the frame of housing 11. A plurality of horizontal positioning rollers 35 are mounted on the carriage 24 to engage the track 34 and horizontally position the carriage.

A light source support 40 is carried by the boom 22 and forms a part of it. The light source support 40 extends through a light-tight region 41 formed in the housing 11. The light source 19 is carried by the support 40 and is positioned within the light-tight region 41.

A pair of constant tension coil springs 42, 43 are carried at the front and rear of the housing and extend across access apertures to the light-tight region 41. Suitable springs are sold under the trademark "Negator" by the Hunter Spring Company. The light source support 40 projects through apertures in the Negator springs 42, 43. The ends of the Negator springs are carried on spaced rotatable coils 44 which are mounted at either end of each light-tight region access aperture. The springs 42, 43 move back and forth with the light source support 40 coiling and uncoiling on the reels 44 to maintain the region 41 light-tight.

A suitable film access slot 45 is provided through the front wall of the housing 11 to permit the insertion of a photographic film holder 46, shown in FIG. 3. The film holder 46 positions a sheet of photographic film 38 for exposure by the light source 19 when a scan is being conducted, as will subsequently be described in greater detail.

A graph support 50 projects laterally of the housing 11 beneath the stylus end of the boom 22 to hold a sheet of graph paper 51. The sheet of paper 51 is of a type which silently records a graphic visual image when an electric charge is passed through the stylus 17 to burn a dot into the paper. One such paper is known as Teledeltos paper and sold by the Western Union Company. The paper 51 is held in position by a plurality of magnets 52.

The stylus 17 is carried by a stylus support 53 of electrically insulating material. A stylus positioning member 54 is pivotally mounted on the support 53 and serves to press the stylus 17 against the paper 51.

Referring to FIG. 1, the probe 15 is supported on a support bar 57. The support bar 57 projects through an aperture 58 formed at the outer end of the boom 22. A rack and pinion arrangement, not shown, is provided for elevating and lowering the probe 15 on its support bar 57 relative to the boom 22.

An automatic mechanism indicated generally by the numeral 60 in FIG. 3 is provided for driving the boom 22 in reciprocal paths both longitudinally and transversely. Such a mechanism is described in detail in the referenced Apparatus Patent, and will not be described here.

Suitable indexing control circuitry for causing the boom to reciprocate longitudinally at any of a wide range of selected speeds is shown in the referenced Apparatus Patent. This patent also describes circuitry for transversely indexing the carriage any selected distance within a wide range of distances.

In accordance with the present invention, an adjustable delay error correction means is provided for delaying the reverse reciprocation of the light support bar 40 relative to the boom 22 upon reversal of the longitudinal reciprocation of the boom. Referring to FIG. 4, the support bar 40 is journaled at opposite ends in bearings 110, 111. The bearings 110, 111 slidably receive the support bar 40 and permit the bar 40 to translate relative to the boom 22.

A shaft 112 extends through an aperture 113 in the bar 40. The shaft 112 is rigidly secured to the bar 40 and extends vertically transversely of the bar 40. A pair of ball bearings 114, 115 are positioned on opposite ends of the shaft 112.

Figure 5:
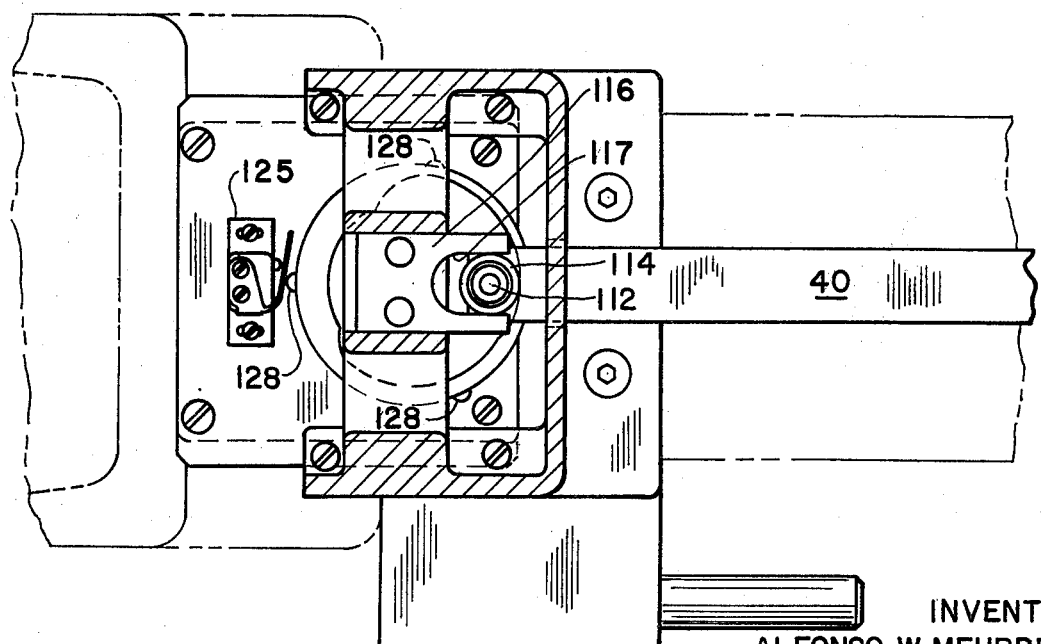

Referring to FIG. 5, the upper bearing 114 is slidably received in a slotted bracket 116. The bracket 116 is carried by the boom 22. A slot 117 formed in the bracket 116 has sides which parallel the longitudinal axis of the support bar 40. By this arrangement, the slotted bracket 116 prevents the rotation of the bar 40 without interfering with its axial translation.

Referring to FIG. 4, a circular cam member 120 is provided beneath the bearing 110. The cam member 120 includes a substantially annular groove 121 which receives the lower bearing 115. The groove 121 varies in width in order to define three separately selectable widths at positions circumferentially spaced around the member 120.

It is the function of the groove 121 to selectively limit the axial translatory motion of the support rod 40 relative to the boom 22. In one of the three positions, the groove is of a width which permits no relative movement of the bearing 115 and the cam member 120. In this position, no relative movement can occur between the boom 22 and the support 40. In the other two positions, the groove 121 is 2mm and 4mm, respectively, wider than the outer diameter of the bearing 115, whereby the support 40 may move 2mm and 4mm, respectively, relative to the boom.

Three limit switches 125, 126, 127 are positioned at one side of the cam member 121. One of three raised projections 128 formed on the periphery of the cam member 121 engages one of these switches when the cam member is positioned in any of its three positions. The limit switches 125, 126, 127 thereby serve to sense the position of the cam member 121, and signal this position to an indicator (not shown) on the control panel 20.

A drive motor 130 is connected through a gear train 131 to a shaft 132 which mounts the cam member 121. By this arrangement, the motor 130 serves to position the cam 130 to adjust the degree of lost-motion between the light support bar 40 and the boom 22.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A scintillation scanner comprising:
   a. a housing and frame structure;
   b. an imaging structure mounted on the housing and frame structure and including a scintillation-responsive signal emitting means;
   c. a drive assembly interposed between said structures for driving said signal emitting means over an area to be studied;
   d. media support means carried by one of said structures and adapted to carry an image producing media;
   e. media stimulating means carried by the other of said structures and adapted to stimulate a media carried by said media support means in response to signals from said signal emitting means; and,
   f. dead time correction means for shifting said media means relative to each other to compensate for relative movement between said media means during the time delay between the time when a scintillation is received by said signal emitting means and the time when the media is caused to be stimulated by said media stimulating means.

2. The scintillation scanner of claim 1 wherein said dead time correction means is adjustable to vary the relative shift between said two media means.

3. A scintillation scanner comprising:
   a. a frame structure and a boom structure movably carried by said frame structure;
   b. signal emitting means carried by said boom structure for producing a signal in response to incident radiation stimuli;
   c. drive means interposed between said structures for driving said boom structure relative to said frame structure along a drive path including spaced parallel scan paths, said drive means being operative to index said boom structure to an adjacent scan path upon reaching the end of one scan path and to reverse the direction of reciprocation of said boom structure;
   d. media support means carried by one of said structures and adapted to receive and support an imaging media;
   e. media stimulating means carried by the other of said structures and operably connected to said signal emitting means for stimulating a media carried by said media support means in response to signals from said signal emitting means;
   f. connection means interposed between said boom structure and the media means supported by said boom structure for shifting said supported media means relative to said boom structure a preselected amount in order to delay the reverse reciprocation of said supported media means upon direction reversal of said boom structure.

4. The scintillation scanner of claim 3 wherein said connection means is adjustable to provide a shift of selected length between said supported media means and said boom structure.

5. A scintillation scanner comprising:
   a. a housing and frame structure;
   b. a driven structure reciprocally carried by said housing and frame structure, said driven structure being reciprocal relative to the housing and frame structure in both longitudinal and transverse directions;
   c. a scintillation-responsive signal emitting means carried by said driven structure;
   d. a drive assembly interposed between said structures for driving said signal emitting means reciprocally along one longitudinal path over an area to be studied and being operable upon reaching the end of said one longitudinal path to index transversely and reverse direction to drive said signal emitting means reciprocally along another longitudinal path;
   e. media support means carried by one of said structures and adapted to carry an image producing media;
   f. media stimulating means carried by the other of said structures and adapted to stimulate a media carried by said media support means in response to signals from said signal emitting means; and,
   g. connection means drivingly coupling one of said media means to a first of said structures to delay the reverse reciprocation of said one media means relative to the other of said media means upon reversal of the longitudinal reciprocation of said driven structure.

6. The scintillation scanner of claim 5 wherein said connection means is adjustable to selectively control the length of the reverse reciprocation delay.

7. The scintillation scanner of claim 5 wherein said media stimulating means is carried by said driven structure and said connection means is interposed between said media stimulating means and said driven structure.

8. The scintillation scanner of claim 7 wherein said connection means comprises a cam means which is adjustable to vary the delay of reverse reciprocation between said driven structure and said media stimulating means.

9. The scintillation scanner of claim 8 wherein:
   a. said media stimulating means includes a support means;
   b. said cam means comprises a substantially circular disc carrying an annular groove; and,
   c. said groove has portions of different width which may be selectively positioned relative to said support means to selectively vary the extent of permitted relative reciprocation between said media stimulating means and said driven structure.

10. A scintillation scanning device comprising:
a. a housing and frame structure;
b. a scan boom movably supported by said frame and housing structure;
c. reciprocal drive means carried in said housing and operably connected to said boom to drive said boom reciprocally in a longitudinal scanning path;
d. transverse drive means carried in said housing and operably connected to said boom to index said boom transversely in a scan indexing path;
e. scintillation responsive signal emitting means carried by said boom;
f. an image device support means carried by said boom, said image device support means being adjustably movable relative to said boom in directions paralleling the path of said longitudinal movement of said boom;
g. visual image record producing means carried by said image device support means; and,
h. connection means coupling said image device support means and said boom for delaying the reverse reciprocation of said image device support means upon reversal of the direction of reciprocation of said boom.

11. The scintillation scanning device of claim 10 wherein said connection means is adjustable to vary length of the reverse reciprocation delay.

12. A scintillation scanner comprising:
a. a supporting frame;
b. a boom movably carried by said frame;
c. a scintillation detector carried by said boom;
d. a light source electrically connected to said scintillation detector to produce a light impulse in response to a scintillation within said detector; and,
e. connection means coupling said light source to said boom in such fashion as will cause said light source to lag behind said boom to a preselected degree during boom reciprocation.

13. The scintillation scanner of claim 12 wherein said connection means is adjustable to vary the extent of reciprocation lag between said boom and said light source.

* * * * *